J. SANDER.
ROD FOR END GATES.
APPLICATION FILED OCT. 22, 1917.
1,268,496.
Patented June 4, 1918.
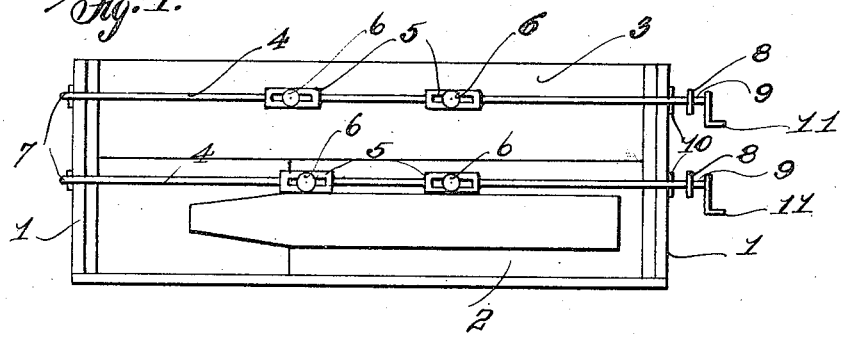
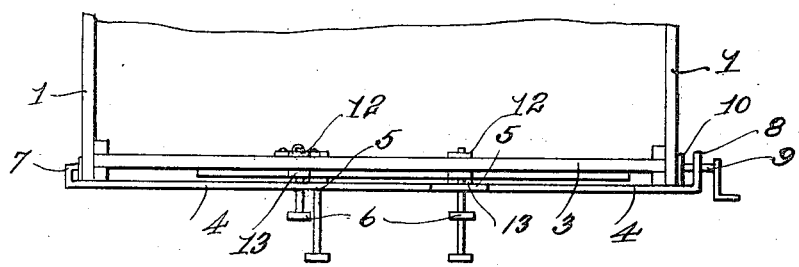
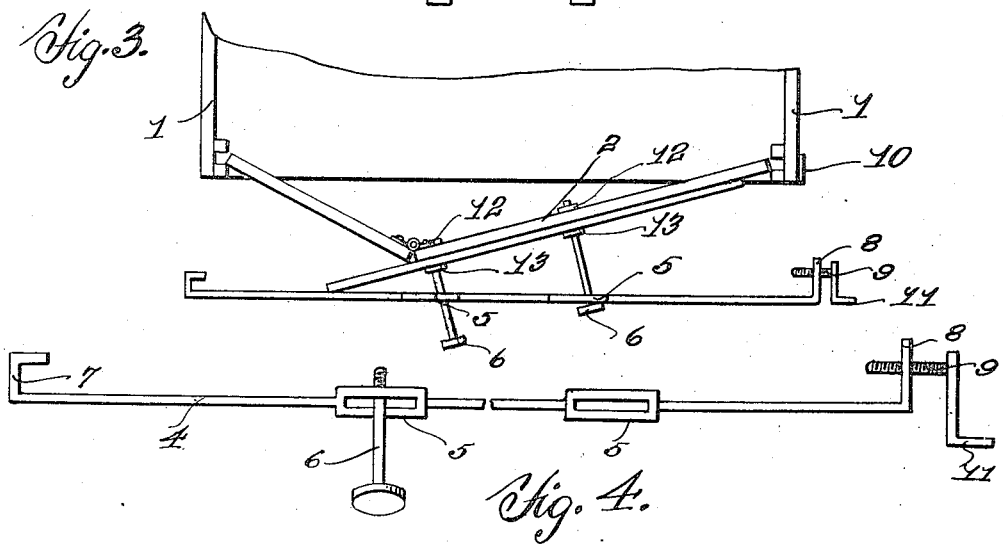
Witnesses
Inventor
J. Sander

UNITED STATES PATENT OFFICE.

JUEL SANDER, OF OLDHAM, SOUTH DAKOTA.

ROD FOR END-GATES.

1,268,496. Specification of Letters Patent. Patented June 4, 1918.

Application filed October 22, 1917. Serial No. 197,917.

*To all whom it may concern:*

Be it known that I, JUEL SANDER, a citizen of the United States, residing at Oldham, in the county of Kingsbury, State of South Dakota, have invented certain new and useful Improvements in Rods for End-Gates; and I do hereby declare the following to be a full, clear, and exact description of the invention, such as will enable others skilled in the art to which it appertains to make and use the same.

This invention relates to wagon box end gates.

The object of this invention is to provide an improved form of end gate wherein the end gate securing rod is permanently secured to the end gate in operative position so that it may be employed to secure the gate to the wagon body. In carrying out the invention, I have adapted it for use as well upon a hinged sectional gate as upon the single piece or rigid gate.

With the above objects in view, and such others relating to the details of construction, as may hereinafter appear, my invention will now be fully set forth and described, reference being had to the accompanying drawings.

In the drawings:—

Figure 1 is a rear view of the wagon body having my invention applied thereto,

Fig. 2 is a plan view of the rear end,

Fig. 3 is a plan view of a hinged sectional gate in broken position, and

Fig. 4 is an enlarged view of the end gate rod and its appurtenances.

Referring more particularly to the drawings, 1 represents the side boards of a wagon body between which the hinged sectional end gate 2 and the top box end gate 3 are adapted to be received. Attached to each one of the gates 2 and 3 is an end gate rod 4, each of the rods 4 being provided with a pair of spaced longitudinally elongated loops 5. Each of the loops 5 has passed therethrough a bolt 6 which is permanently mounted in the end gate so as to permit the rods 4 to have a certain degree of lateral play. One end of each of the rods 4 is overturned into a hook 7 which is intended to be engaged over the end of the corresponding side board 1, and have its extremity embedded therein when the rod is tightened up. The opposite end of each of the rods 4 is also overturned and flattened out to provide a threaded bearing 8 within which a crank bolt 9 is engaged. The crank bolts 9 are provided with heads which are adapted to bear against the outer faces of the corresponding side boards 1, or else behind the bearing plates 10 carried by the side boards. In this connection, it may also be desirable to provide similar plates upon the side boards of the opposite side of the wagon so that the hooked ends 7 may be caught therebehind. The outer ends of the crank bolts 9 are provided with cranks 11 by means of which the bolts may be screwed up in order to draw the rods 4 into securing relation.

In the case of the sectional end gate 2, the bolts 6 or at least one of the bolts 6 is made of such length that the hinged sections of the gate may be swung out of alinement the requisite distance to allow the ends thereof to be engaged between the end gate cleats of the side boards, thereby avoiding any interference between the rod 4 and the sections of the end gate 2. This relationship of rod and hinged sections of the gate can be maintained whether the sections are of equal length, so as to bring the hinges at the middle of the gate, or are of different lengths, so that the hinges are at one side of the center. The bolts 6 are threaded and are preferably provided with the inner nuts 12 and the outer nuts 13, which permit the adjustable tightening of the bolts on the end gates.

By the arrangement above described, the loss of the end gate rods is prevented, either by working loose while on the road, with a consequent loss of the gates, or by being misplaced when the end gates are removed. The method of securing the rods in position is effective and the gates may be inserted or removed with greater facility than is possible by the use of the old fashion form gate securing rods.

What I claim as my invention is:—

An end gate for wagons, comprising in combination with an end gate, an end gate rod having a plurality of elongated loops formed in its length, bolts extended from the end gate and permanently engaged with said loops, a hook upon one end of the rod engaged over a wagon body side board, and a screw carried by the other end and adapted to be turned against the end of a wagon body side board at the opposite side of the body.

In testimony whereof, I affix my signature in the presence of two witnesses.

JUEL SANDER.

Witnesses:
C. F. LOOSE,
GEO. P. BUTLER.

Copies of this patent may be obtained for five cents each, by addressing the "Commissioner of Patents, Washington, D. C."